(12) United States Patent
Choudhary et al.

(10) Patent No.: US 12,346,583 B2
(45) Date of Patent: Jul. 1, 2025

(54) TRACKING DATA USAGE IN STORAGE DEVICES

(71) Applicant: Western Digital Technologies, Inc., San Jose, CA (US)

(72) Inventors: Anamika Choudhary, Bangalore (IN); Lovish Singla, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 107 days.

(21) Appl. No.: 17/721,117

(22) Filed: Apr. 14, 2022

(65) Prior Publication Data

US 2023/0333761 A1    Oct. 19, 2023

(51) Int. Cl.
*G06F 3/06* (2006.01)

(52) U.S. Cl.
CPC ............ *G06F 3/064* (2013.01); *G06F 3/0607* (2013.01); *G06F 3/065* (2013.01); *G06F 3/0653* (2013.01); *G06F 3/0679* (2013.01)

(58) Field of Classification Search
CPC ...... G06F 3/0604; G06F 3/0607; G06F 3/065; G06F 3/0653; G06F 3/0679
See application file for complete search history.

(56) References Cited

U.S. PATENT DOCUMENTS

| | | | |
|---|---|---|---|
| 8,849,761 B2 | 9/2014 | Prahlad et al. | |
| 2011/0307573 A1* | 12/2011 | Lingafelt | ............ H04L 67/1097 713/340 |
| 2012/0317337 A1 | 12/2012 | Johar et al. | |
| 2018/0373722 A1 | 12/2018 | Ulasen et al. | |
| 2019/0095116 A1* | 3/2019 | Igahara | ................ G06F 12/0246 |
| 2019/0179698 A1* | 6/2019 | Liu | ........................ G06F 3/0679 |
| 2022/0067106 A1* | 3/2022 | Saez | ........................ H04L 67/06 |

OTHER PUBLICATIONS

Tan, B. et al., "Adaptive Data-Coldness Classification for Solid State Drives" Technical Disclosure Commons, Oct. 26, 2020, https://www.tdcommons.org/dpubs_series/3698.
Hiep, N.V. et al., Timestamp-based Hot/Cold Data Identification Scheme for Solid State Drives. In Proceedings of International Conference on Research in Adaptive and Convergent Systems. Honolulu, HI, USA, Oct. 9-12, 2018 (RACS '18) , 5 pages. https://doi.org/10.1145/3264746.3264790.

* cited by examiner

*Primary Examiner* — Edward J Dudek, Jr.
(74) *Attorney, Agent, or Firm* — Rutan & Tucker LLP; Hani Z. Sayed; Ravi Mohan (57) ABSTRACT

Storage devices include a memory array comprised of a plurality of memory devices. These memory devices typically have a plurality of metadata associated with them in addition to the data stored within. This metadata may include a timestamp indicating when the last host command, such as a read or write command, was processed on each of the memory devices. Using this timestamp metadata, the storage device can classify data based on how long it has been since last processed. Once known, the storage device can process memory devices that have not been processed after a certain period of time. This processing can include avoiding wear leveling, transferring data to an external cloud service, or compressing data, among others. During processing, such as compaction, timestamps associated with the data stored in each memory device can be transferred or otherwise associated with any destination memory device, thereby preserving the generated data classifications.

12 Claims, 7 Drawing Sheets

TRACKING DATA USAGE IN STORAGE DEVICES

FIELD

The present disclosure relates to storage systems. More particularly, the present disclosure relates to tracking operations on memory devices to improve storage device lifespans and increase available storage space.

BACKGROUND

Storage devices are ubiquitous within computing systems. Solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

SSD storage devices comprise a number of memory devices within a memory array that store data. However, each memory device is limited in the number of write and read cycles that can occur before errors are exhibited. In order to increase the lifespan of SSDs, many employ a "wear leveling" process to ensure that read and write cycles occur in a somewhat even distribution across all of the memory devices within a memory array. Thus, it will typically take longer to reach the useful life of the memory devices within the storage device.

However, wear leveling processes are not without cost and can require additional energy and processing cycles to complete. Additionally, large amounts of data in a typical retail storage device are often untouched or rarely accessed for long periods of time, including years. This discrepancy in data usage can lead to increase wear leveling as a smaller portion of the memory array is available for reading and writing frequently used data.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that generate timestamp metadata and classify memory devices in order to facilitate better operations within the storage device. Over a period of time, a user of a retail storage device can accumulate a large amount of data. Often, a large portion of this data is stored and never or infrequently accessed again. However, current storage devices don't have the ability to know or classify this untouched data. Therefore, in many embodiments, the storage device can be configured to generate a timestamp and associate it with various memory devices within the memory array upon receiving and/or executing a host command. By assigning each memory device, memory block, or other memory structure with a timestamp, the length of time the data has been untouched can be determined. This can be accomplished through comparing the current timestamp with the timestamp assigned to the memory device/block.

By determining the length of time between accesses, the storage device can be further configured to classify the data and storage devices/blocks storing it. For example, some embodiments may create four classifications including untouched data (accessed more than one year ago), rarely touched data (accessed more than six months ago but less than one year), occasionally touched data (accessed less than six months ago but greater than thirty days ago), and frequently touched data (accessed within the past thirty days). However, these classifications can vary and be configured based on the application desired.

Once classified, other operations can be done in response to these classifications. For example, various processes can begin once a certain number or percentage of memory devices, memory blocks, or other memory structures fall within a particular category. In additional embodiments, various processes can be triggered and then executed on data within one or more associations. These processes can include compaction, transferring data to a cloud-based service, and the like.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circu Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or bloc It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
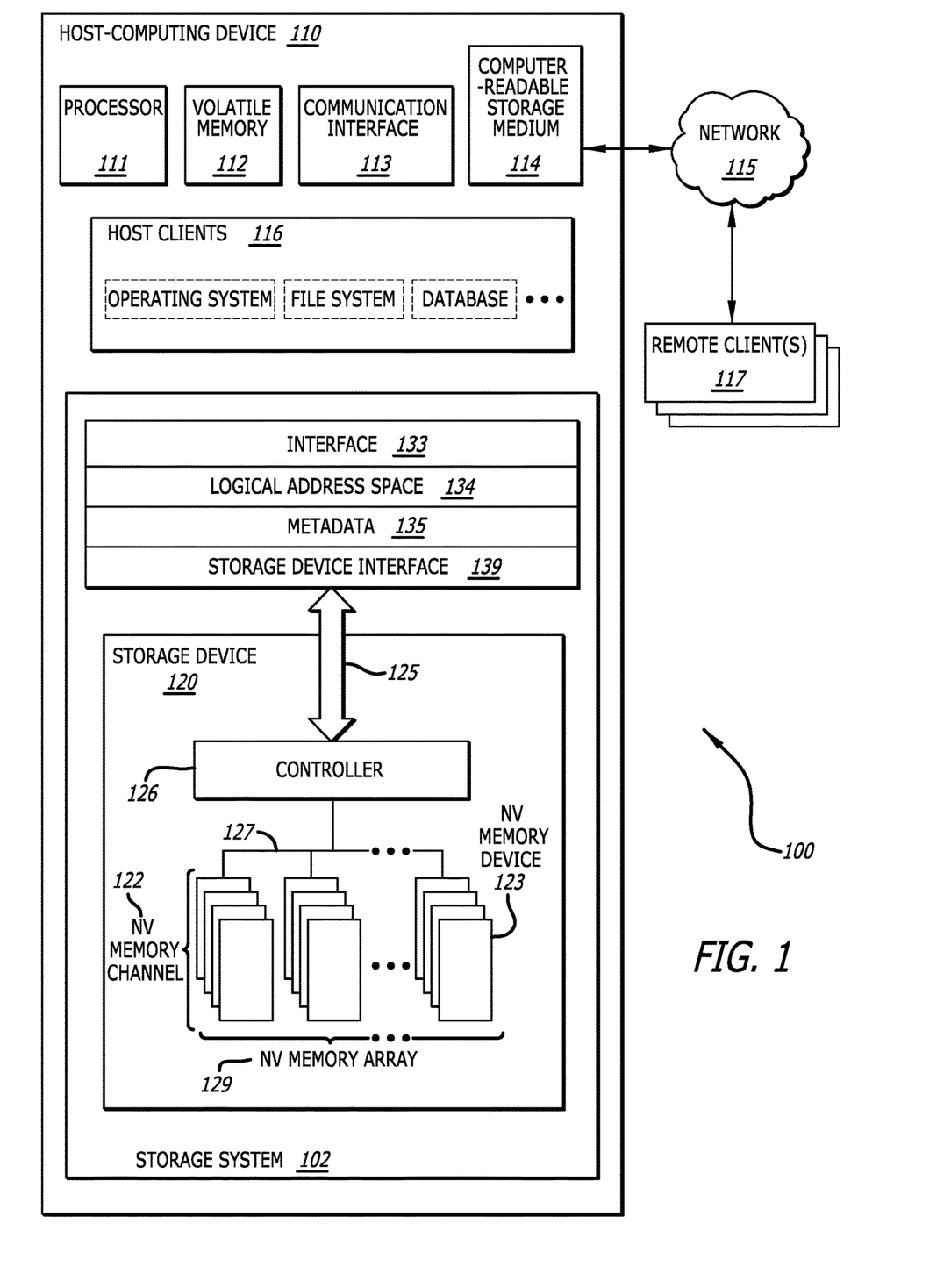
FIG. 1 is a schematic block diagram of a host-computing device with a storage device suitable for usage tracking in accordance with various embodiments of the disclosure.

Referring to FIG. 1, a schematic block diagram of a host-computing device 110 with a storage device 120 suitable for usage tracking in accordance with various embodiments of the disclosure is shown.

The usage tracking system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
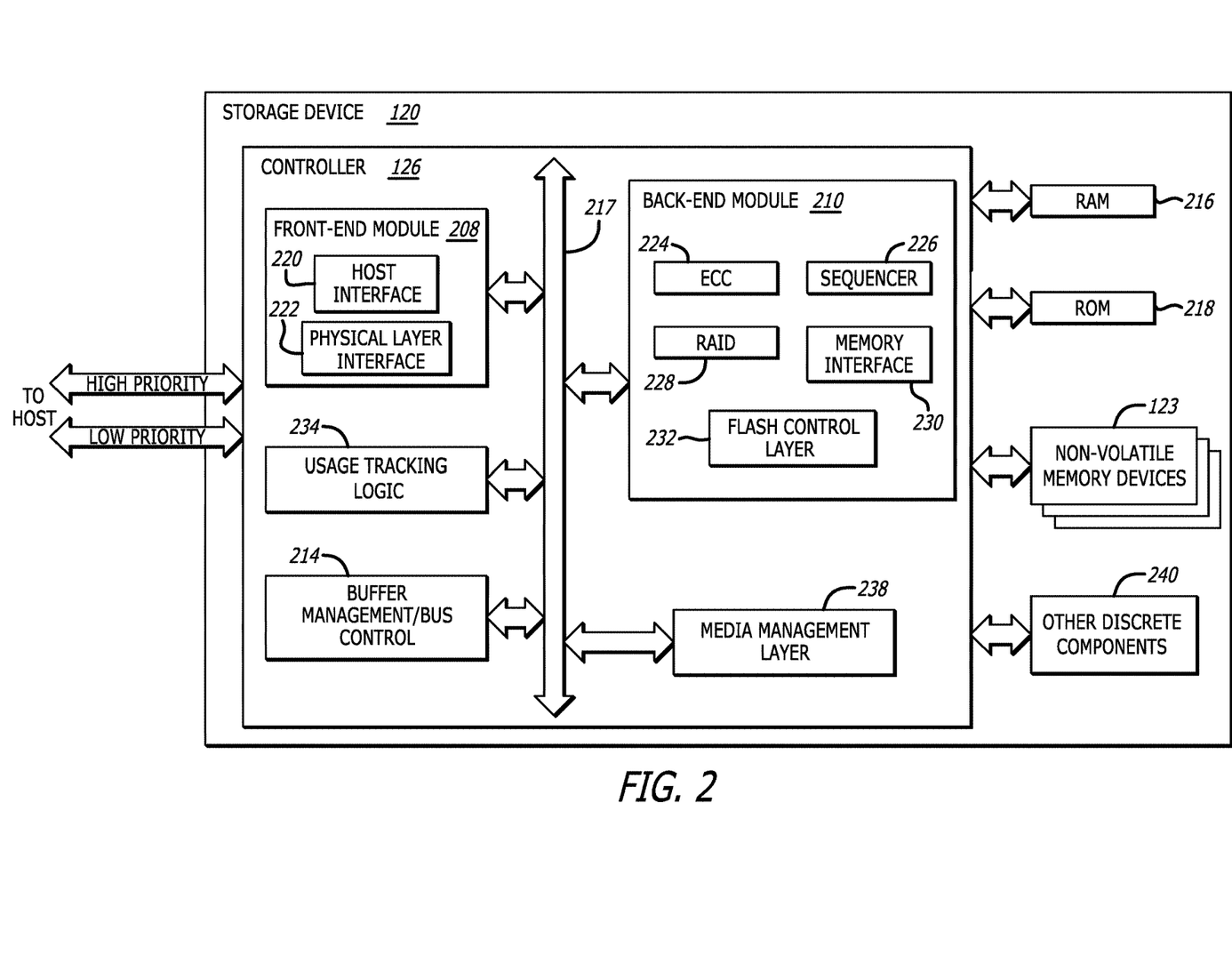
FIG. 2 is a schematic block diagram of a storage device suitable for usage tracking in accordance with various embodiments of the disclosure.

Referring to FIG. 2, a schematic block diagram of a storage device suitable for usage tracking in accordance with various embodiments of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a usage tracking logic 234. In many embodiments, the usage tracking logic 234 can be configured to facilitate generating timestamps and related metadata, classifying memory devices, and maintaining classification list data. As discussed in more detail below, the usage tracking logic 234 can monitor incoming host commands and generate a timestamp related to each one (either at receipt, completion, or in-between). The usage tracking logic 234 can assign or otherwise associate timestamp data as metadata to each memory device or data storage structure as needed. In additional embodiments, the usage tracking logic 234 can classify each memory device or structure wherein classification can be configured to indicate the amount of usage or access each one receives. These classifications can be utilized to generate one or more predetermined thresholds. The usage tracking logic 234 can utilize these thresholds associated with the classifications to begin and execute various processes. As described in more detail below, example processes include compaction and cloud-based data transfers. In some embodiments, the usage tracking logic 234 can further facilitate these processes as required.

Figure 3:
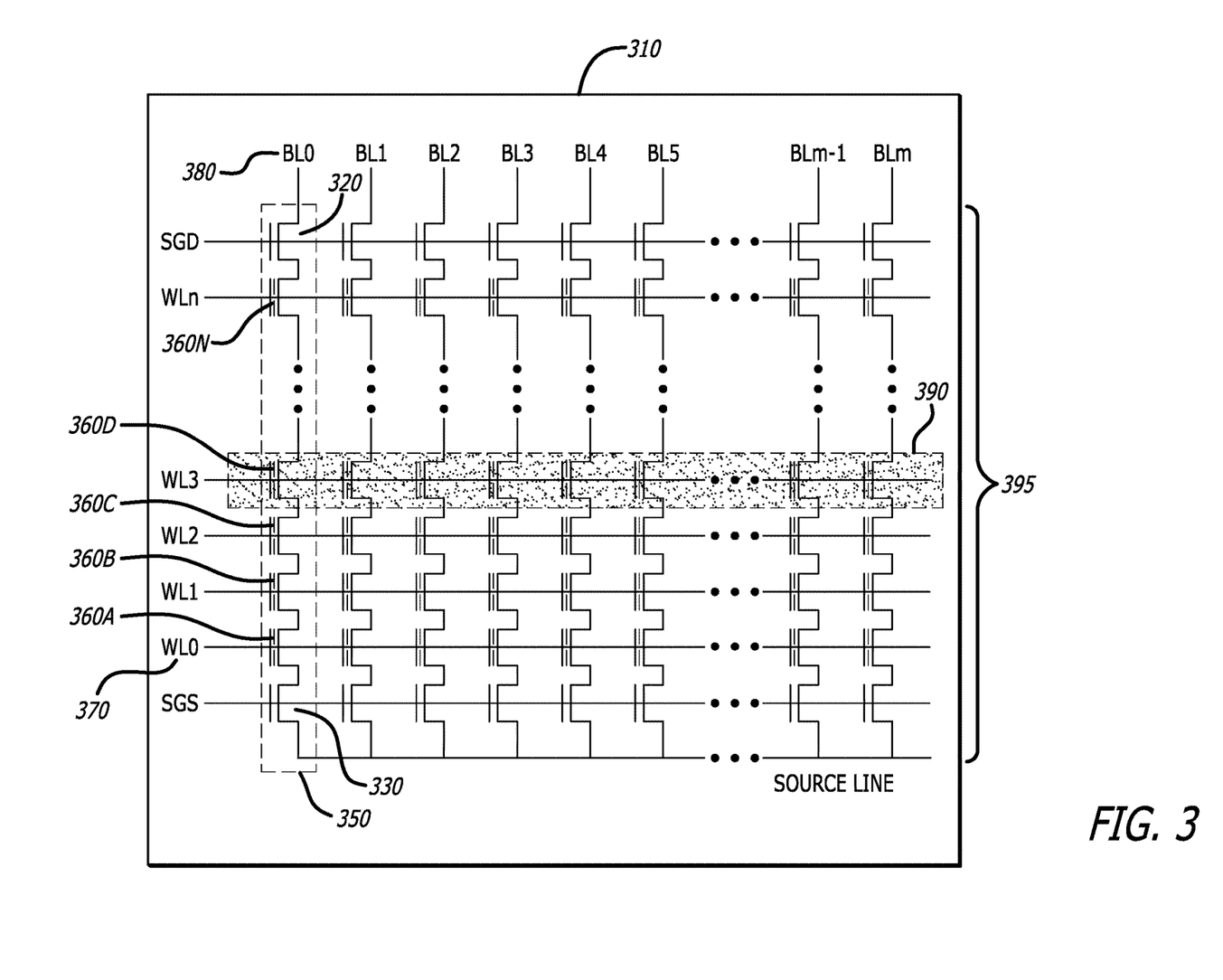
FIG. 3 is a conceptual schematic diagram of a memory array in accordance with various embodiments of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations. The sum of these groups of pages is considered a block 395. The memory block 395 can also be further arranged and configured with other memory blocks to generate larger memory structures.

This disclosure is not limited to the memory arrays as described in FIG. 3 but can cover all relevant memory structures as understood by one skilled in the art. Other memory arrays are possible, such as memory arrays in a NOR configuration or a memory array made of ReRAM memory cells. Multiple two-dimensional memory arrays or three-dimensional memory arrays (monolithic or non-monolithic) may be formed on separate chips and then packaged together to form a stacked-chip memory device. Multiple memory arrays may be coupled together to form the non-volatile memory of a solid state drive.

Figure 4:
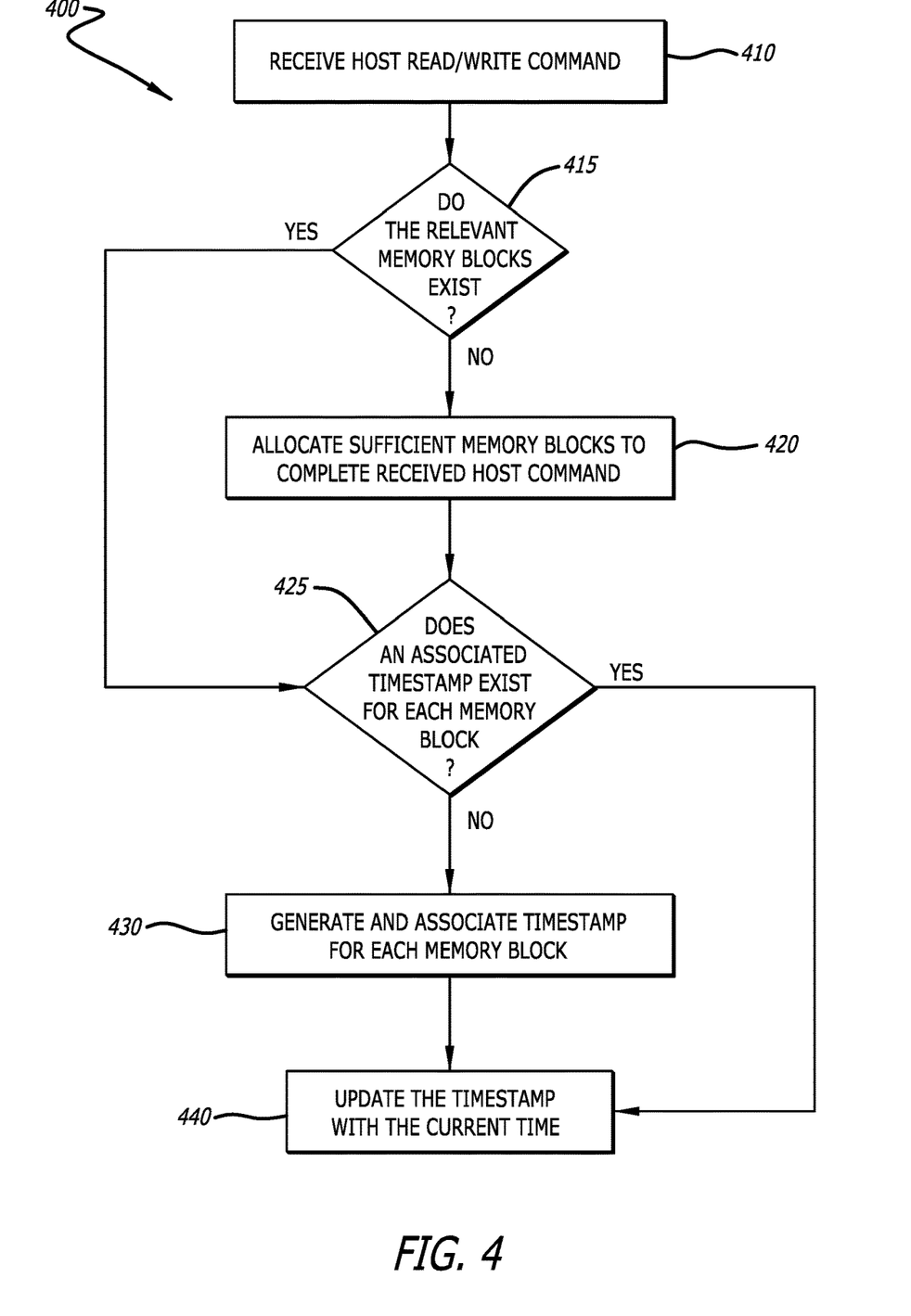
FIG. 4 is a flowchart depicting a process for generating and storing timestamp metadata in accordance with an embodiment of the disclosure.

Referring to FIG. 4, a flowchart depicting a process 400 for generating and storing timestamp metadata in accordance with an embodiment of the disclosure is shown. In many embodiments, the storage device is configured to receive various read and/or write commands from the host (block 410). These commands are related with storing and reading data back and forth from the storage device to the host. In certain instances, such as a newly installed storage device, memory devices may not yet be allocated or configured for use prior to the reception of a host command to store data.

As discussed previously, various storage devices group memory devices into blocks for storage and processing. The process 400 can determine if the relevant memory blocks necessary to complete the received host command already exist (block 415). If there are not sufficient memory blocks to complete the host command, the process 400 can allocate those sufficient memory blocks needed (block 420). Once allocated, or when it has been verified that sufficient memory blocks are already available, the process 400 can then determine if each of the memory blocks has an associated timestamp (block 425). These timestamps can be configured in a number of ways, and as discussed previously are often stored as metadata.

If no timestamps are associated with each of the memory devices/blocks being utilized in processing the host command, the process 400 can generate a timestamp and associate it with each of those memory devices/blocks (block 430). Once the timestamp has been generated and associated, or if a memory device/block already has an associated timestamp, the process 400 can update the timestamp with the current time (block 440). In certain embodiments, the timestamp can be generated internally, while in additional embodiments, the timestamp may be received from the host computing device. Once updated, the storage device may begin to classify these memory devices/blocks based on the timestamps. Such a process is described below.

Figure 5:
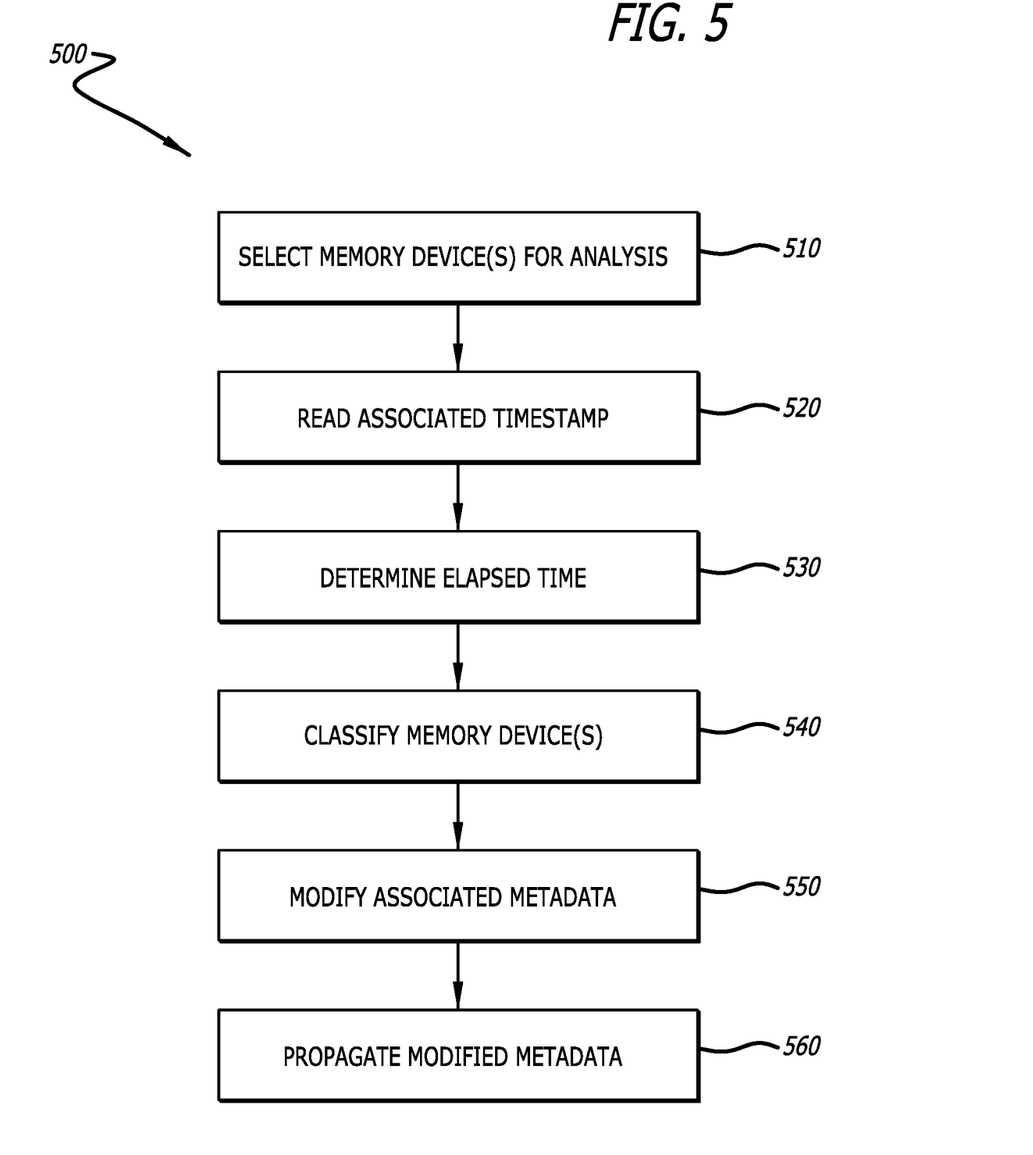
FIG. 5 is a flowchart depicting a process for classifying memory devices based on timestamp metadata in accordance with an embodiment of the disclosure.

Referring to FIG. 5, a flowchart depicting a process 500 for classifying memory devices based on timestamp metadata in accordance with an embodiment of the disclosure is shown. In some embodiments, the memory devices and/or blocks within a storage device may undergo analysis to classify various qualities associated with the timestamps. The process 500 can begin by selecting a plurality of memory devices for analysis (block 510). As previously discussed, the timestamp metadata may be associated with a variety of memory structures. In certain embodiments, each block may be associated with a single timestamp. However, embodiments that assign a timestamp to each memory device, line, page, or other combination of memory devices are contemplated.

Once the selected memory devices/blocks are known, the timestamps associated with them can be read (block 520). From this point, the process can determine the elapsed time between the currently known time and the time indicated by the time stamp (block 530). In some embodiments, this determination can be accomplished through a comparison of dates and times stored within the timestamp metadata and the current date and time fetched from an internal or external source. In further embodiments, the determination can be completed through a simple subtraction method between values obtained from an elapsed starting point or epoch in time, not unlike a Unix time stamp. This subtraction of the timestamp metadata value from the current timestamp value yields a new elapsed time value which can be utilized for further classification and other processing.

Once the amount of elapsed time is known, the process 500 can classify each of the memory devices (block 540). Classification can be done in any of a variety of ways based on the needs of the current application. For example, a classification system may be configured to assign a memory device, block, or other structure to four categories such as frequently used, occasionally used, rarely used, and untouched. Untouched memory blocks can be determined by not only looking at the elapsed time, but also by comparing other metadata such as an additional timestamp indicating when the data was last accessed, or a counter that indicates the number of times it has been accessed. While untouched memory devices indicate that they have not been accessed since being stored within the memory array, the thresholds for classification into the other categories can vary.

For example, the determination of each classification threshold may be configured as a fixed value during the manufacturing process based on previously known usage data and typical drive performance. In additional embodiments, the thresholds may be dynamically set based on each storage device's particular usage history. For example, a frequently accessed block toward the beginning of the storage device's lifespan may be utilized much more as that data takes up a larger portion of the used memory of the drive, but as the memory array fills up, the number of times that same data is accessed can go down. Thus, certain embodiments may set these classification thresholds in a relative scale with each classification associated with a relative percentage of usage compared to the total received host commands.

Once classified, each of the memory devices, blocks, or other structures can have any associated metadata modified to reflect this new classification (block 550). In many embodiments, a designation associated with the memory device/block is stored into a list for their corresponding classification. In still more embodiments, the metadata associated with the memory device/block has another entry added or changed to indicate the currently determined classification. In some embodiments, the metadata associated with the memory device/block may not be modified, but a master or global metadata list, such as an LBA can be modified to reflect any new classifications. Once modified, this change can be propagated out to the entire storage device (block 560). This propagation can be accomplished through a flush operation or other internal update processes to make each component within the storage device aware of the new classifications. Once classifications have been completed, the storage device may begin various operations based on those classifications. Such operations are described below.

Figure 6:
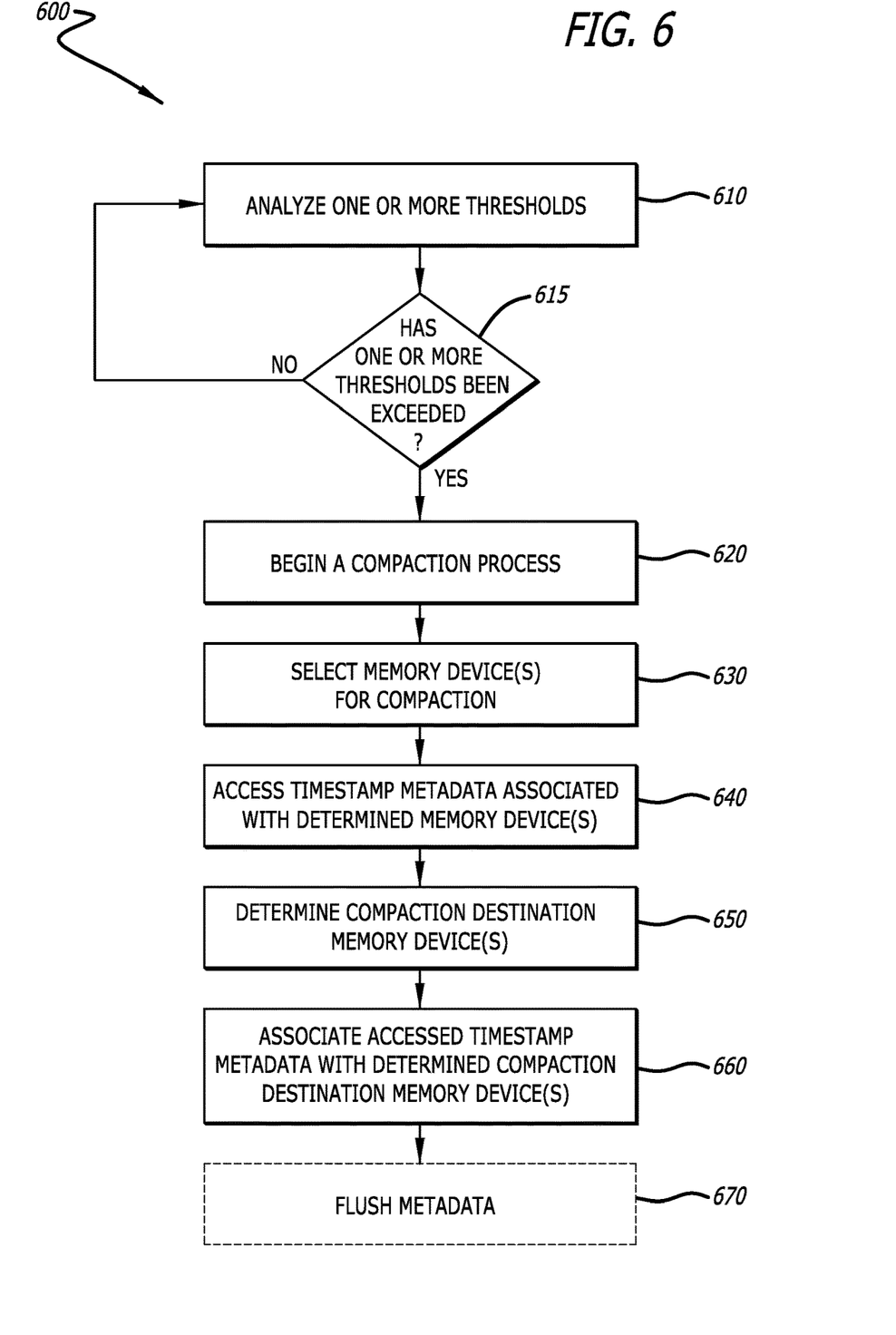
FIG. 6 is a flowchart depicting a process for executing a compaction process in response to timestamp metadata in accordance with an embodiment of the disclosure.

Referring to FIG. 6, a flowchart depicting a process 600 for executing a compaction process in response to timestamp metadata in accordance with an embodiment of the disclosure is shown. During normal operations, storage devices may process memory devices or blocks in various ways. Some of these processes involve garbage collection or compaction, for example. Compaction may be configured to select various memory blocks or other structures that have some valid data on them while also having various memory devices storing invalid or unneeded data. Many storage devices are currently configured to only allow deletion of data on a block level. Thus, memory blocks that contain some valid data are at risk of data loss if the remaining invalid data is erased. To counter this issue, compaction processes may be configured to copy the valid data on a given block or other memory structure, and move it to a new block. This process can occur over multiple blocks at once, leading to smaller chunks of valid data across many blocks being "compacted" into a single block comprised of all valid data. The original blocks are then suitable for deletion without losing any valid data.

In many embodiments, the storage device can analyze one or more thresholds related to compaction (block 610). Compaction can be based on a variety of thresholds. In certain embodiments, the thresholds may relate to global variables such as percentage of the memory array currently in use, or the number of read/write host commands processed. However, thresholds may be configured to be based on one or more classifications. For example, if a memory array is comprised of at least twenty-five percent of memory devices and/or blocks that are classified as untouched, a compaction process may begin. However, as those skilled in the art will recognize, a great many varieties of thresholds may occur to trigger a compaction or other storage device maintenance process.

Once the process 600 analyzes the various thresholds, the determination can be made on whether one or more of these thresholds has been exceeded (block 615). When they have not, the process 600 can return to analyze various thresholds (block 610). However, when a threshold has been exceeded, the compaction (or other maintenance) process can begin (block 620). This typically involves selecting one or more memory devices, blocks, or other memory structures for compaction (block 630). In order to preserve the timestamps associated with each of the memory devices/blocks, the process 600 can access the timestamp metadata associated with the selected memory device(s) (block 640).

Once accessed, the process 600 can determine which new memory block or other structure destinations the data will be moved to (block 650). Once the data has been moved to these destination memory blocks and/or structures, the process 600 can associate the accessed timestamp metadata with the determined compaction destination memory devices (block 660). In some embodiments, this association can be accomplished by updating the pointer associated with the metadata. In further embodiments, the metadata itself may be copied and/or transferred to a new location representative of the new destination memory blocks/structures. Finally, in certain embodiments, the process 600 can flush out the metadata (block 670). This flushing can be done to avoid out-of-date metadata remaining in memory, or may be utilized to propagate any changes out to the entire storage device system.

Figure 7:
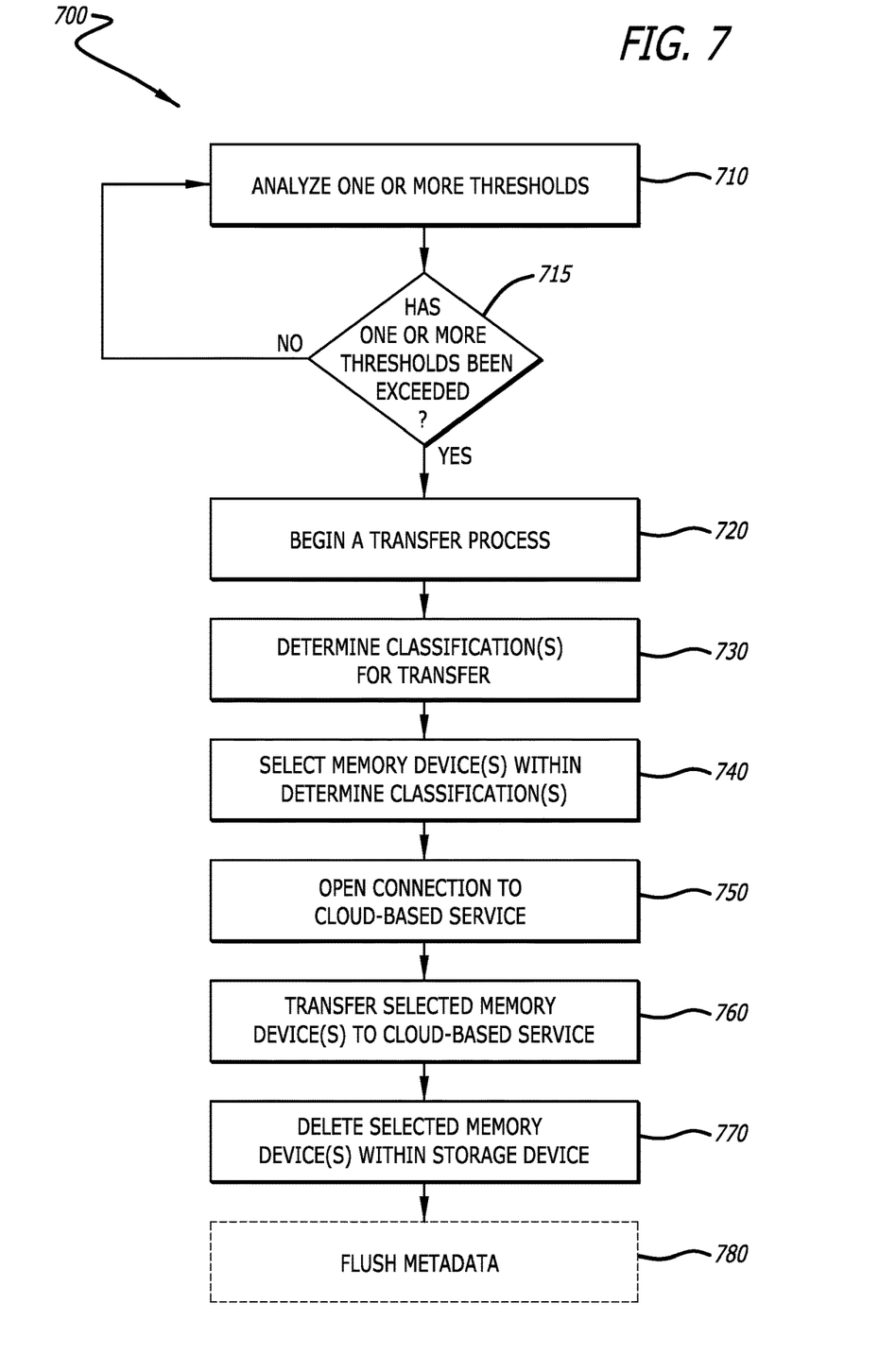
FIG. 7 is a flowchart depicting a process for executing a data transfer to a cloud-based service in response to timestamp metadata in accordance with an embodiment of the disclosure.

Referring to FIG. 7, a flowchart depicting a process 700 for executing a data transfer to a cloud-based service in response to timestamp metadata in accordance with an embodiment of the disclosure is shown. As with the discussion of FIG. 6, during normal operations, storage devices may process memory devices or blocks in various ways. Some of these processes involve transferring untouched or other infrequently accessed data to a cloud-based storage service. In this way, storage devices can have a memory array cleared of data and increase available storage space.

In many embodiments, the storage device can analyze one or more thresholds related to cloud-based transfers (block 710). Cloud-based transfers can be based on a variety of thresholds. In certain embodiments, the thresholds may relate to global variables such as percentage of the memory array currently in use, or the number of read/write host commands processed. However, thresholds may be configured to be based on one or more classifications. For example, if a memory array is comprised of at least twenty-five percent of memory devices and/or blocks that are classified as untouched, a cloud-based transfer process may begin. However, as those skilled in the art will recognize, a great many varieties of thresholds may occur to trigger a transfer or other storage device maintenance processes.

Once the process 700 analyzes the various thresholds, the determination can be made on whether one or more of these thresholds has been exceeded (block 715). When they have not, the process 700 can return to analyze various thresholds (block 710). However, when a threshold has been exceeded, the cloud-based transfer (or other maintenance) process can begin (block 720). This typically involves determining what classification(s) of memory devices/blocks should be transferred to the cloud-based service (block 730).

Once determined, the process 700 can select one or more memory devices, blocks, or other memory structures for transfer (block 740). In certain embodiments, this may be accomplished by accessing a list of blocks that are associated with each classification. In further embodiments, this may require polling or accessing timestamp metadata associated with each memory device/block within the memory array.

Once determined, the process 700 can open a connection to a cloud-based service (block 750). In many embodiments, this connection can be established through a host computing device and facilitated through one or more specialized vendor-specific commands. In some embodiments, the storage device itself may have access and utilize a network connection to establish a unique connection to a cloud-based service. In additional embodiments, the storage device manufacturer may provide additional applications for executing on the host computing device to provide one or more connections between the storage device and cloud-based service.

Once established, the storage device can transfer the selected memory devices/blocks to the cloud-based service (block 760). Again, in certain embodiments, the host computing device may execute the transfer over a network connection with marked data passed to it from the storage device for cloud-based storage. Once the data has been successfully transferred outside of the storage device, the process 700 can delete selected memory device(s), blocks, or other memory structures, within the storage device (block 770). Since these memory devices are now free, the available space for storing data within the storage device has thus been increased. In response to receiving a request for data that was transferred to the cloud-based service, the connection may be reestablished and the requested data downloaded and presented to the host-computing device. In certain embodiments, the process 700 may optionally flush any metadata associated with the transferred memory device/blocks (block 780). In this way, timestamp metadata and/or metadata indicating external storage of the data can be propagated to all necessary components of the storage device.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a processor;
   a memory array comprising:
      a plurality of memory devices wherein the memory devices are configured into a plurality of memory blocks; and
   a usage tracking logic configured to:
      receive a host command from a host associated with one or more memory devices;
      determine a plurality of memory devices required to process the received host command;
      process the received host command;
      generate a timestamp, wherein the timestamp corresponds to the time of completion of processing the received host command;
      associate the timestamp with the determined plurality of memory devices;
      store the timestamp as metadata; and
      execute a compaction process on the plurality of memory devices, wherein the compaction process is configured to:
         move data associated with the determined plurality of memory devices to a second plurality of memory devices;
         determine the generated timestamps associated with each of the determined plurality of memory devices; and
         associate the determined timestamps with the moved data within the second plurality of memory devices.

2. The device of claim 1, wherein a data structure is configured to group the blocks into one or more lists associated with each classification.

3. The device of claim 1, wherein the compaction process is executed in response to exceeding a predefined threshold.

4. The device of claim 3, wherein the predefined threshold is associated with a number of blocks within one or more classifications.

5. The device of claim 3, wherein the predefined threshold is associated with a percentage of blocks within one or more classifications.

6. The device of claim 3, wherein the determination of beginning the compaction process occurs within the device.

7. The device of claim 3, wherein the determination of beginning the compaction process occurs within the host and is received by the device.

8. A method, comprising:
   receiving, via a host, a host command associated with one or more memory devices within a memory array configured within a storage device;
   determining, through one or more processors associated with the storage device, a plurality of memory devices required to process the received host command;
   processing the received host command;
   generating from within the storage device, a timestamp, wherein the timestamp corresponds to the time of completion of processing the received host command;
   associating the timestamp with the determined plurality of memory devices;
   storing the timestamp as metadata;
   transferring data associated with the plurality of memory devices to an external cloud-based service;
   determining that a predetermined threshold based on the stored metadata has been exceeded; and
   executing a compaction process on the plurality of memory devices, wherein the compaction process is configured to:
      move data associated with the determined plurality of memory devices to a second plurality of memory devices;
      determine the generated timestamps associated with each of the determined plurality of memory devices; and
      associate the determined timestamps with the moved data within the second plurality of memory devices.

9. The method of claim 8, wherein the predetermined threshold is associated with a percentage of used memory devices available within the memory array.

10. A device comprising:
    a processor,
    a memory array comprising:
    a plurality of memory devices wherein the memory devices are configured into a plurality of memory blocks; and
    a usage tracking logic configured to:
       receive a host command from a host associated with one or more memory devices;
       determine a plurality of memory devices required to process the received host command;
       process the received host command;
    generate a timestamp, wherein the timestamp corresponds to the time of completion of processing the received host command; and
    associate the timestamp with each of the determined plurality of memory devices;
    store the timestamp as metadata;
    transfer, upon exceeding a predetermined threshold, the metadata to the host, wherein the predetermined threshold is associated with one or more elapses in time from the generated timestamp; and
    execute a compaction process on the plurality of memory devices, wherein the compaction process is configured to:
       move data associated with the determined plurality of memory devices to a second plurality of memory devices;
       determine the generated timestamps associated with each of the determined plurality of memory devices; and
       associate the determined timestamps with the moved data within the second plurality of memory devices.

11. The device of claim 10, wherein the transfer is executed in response to one or more processes generated within the device.

12. The device of claim 10, wherein the transfer is executed in response to a received host command.

* * * * *